INVENTORS.
CHESTER L. MORRIS
ARLING DIX BROWN JR.
LEO F. VALENTI
BY William J. F. Flynn
ATTORNEY Sept. 3, 1957     A. D. BROWN, JR., ET AL     2,805,113
PEN RECORDER Filed April 27, 1954     3 Sheets-Sheet 2

INVENTORS
CHESTER L. MORRIS
ARLING DIX BROWN JR.
LEO F. VALENTI
BY Eber J. Hyde
ATTORNEY Sept. 3, 1957 A. D. BROWN, JR., ET AL 2,805,113
PEN RECORDER
Filed April 27, 1954 3 Sheets-Sheet 3

INVENTORS
CHESTER L. MORRIS
ARLING DIX BROWN JR.
LEO F. VALENTI
BY *Eber J. Hyde*
ATTORNEY

United States Patent Office 2,805,113
Patented Sept. 3, 1957

2,805,113
PEN RECORDER

Arling Dix Brown, Jr., East Cleveland, Chester L. Morris, Cleveland, and Leo F. Valenti, Garfield Heights, Ohio, assignors to Clevite Corporation, Cleveland, Ohio, a corporation of Ohio Application April 27, 1954, Serial No. 425,932

12 Claims. (Cl. 346—49)

This invention relates to improvements in a pen recorder.

In one known type of pen recorder in extensive use a flexible elongated record chart of paper is moved at a uniform speed across a writing bar. A suitable marking mechanism, such as a pen which applies ink to the record chart or a spark pen, has its writing tip overlying the record chart at the writing bar. The recording pen is actuated in response to the signals to be recorded to move its writing tip in an arc transverse to the direction of movement of the record chart across the writing bar, thereby producing on the record chart a trace which represents a visual record of the input signals. One of the most severe problems in connection with such pen recorders is that of maintaining the record chart in snug conformity to the surface of the writing bar as it moves thereacross, so that the pen trace impressed on the record chart will not be distorted due to the paper billowing out away from the writing bar. At the same time, there must not be excessive tension on the paper as it is pulled across the writing bar; otherwise the movement of the record chart will tend to be irregular.

The foregoing practical difficulties are eliminated in the present invention by the provision of a novel construction and arrangement of the writing bar and the record chart supply and takeup mechanism which insures that the moving record chart lies flat snugly on the writing bar where the recording pen produces the record trace on the chart.

Accordingly, it is an important object of the present invention to provide a novel and improved arrangement in a pen recorder which maintains the record chart in snug engagement with the writing bar as it moves thereacross.

It is also an object of this invention to provide a novel arrangement in a multichannel pen recorder which facilitates converting the unit from operation with a particular number of record channels to operation with a different number of record channels, such as from six channel operation to four channel operation.

Another object of the present invention is to provide in a pen recorder a novel arrangement which insures proper centering of the takeup roll on the takeup shaft and which prevents slip of the record chart thereat.

A further object of this invention is to provide in a multichannel pen recorder a novel and simplified arrangement for adjusting the lateral position of the record chart, so that the several record channels are properly aligned with their respective recording pens.

For the achievement of the foregoing objectives, as well as such further purposes and advantages as will become apparent hereinafter, there may desirably be provided the specific arrangement pointed out in the following detailed description and illustrated in the accompanying drawing. However, it is to be understood that the present invention is susceptible of various embodiments different from that described herein.

Figure 1:
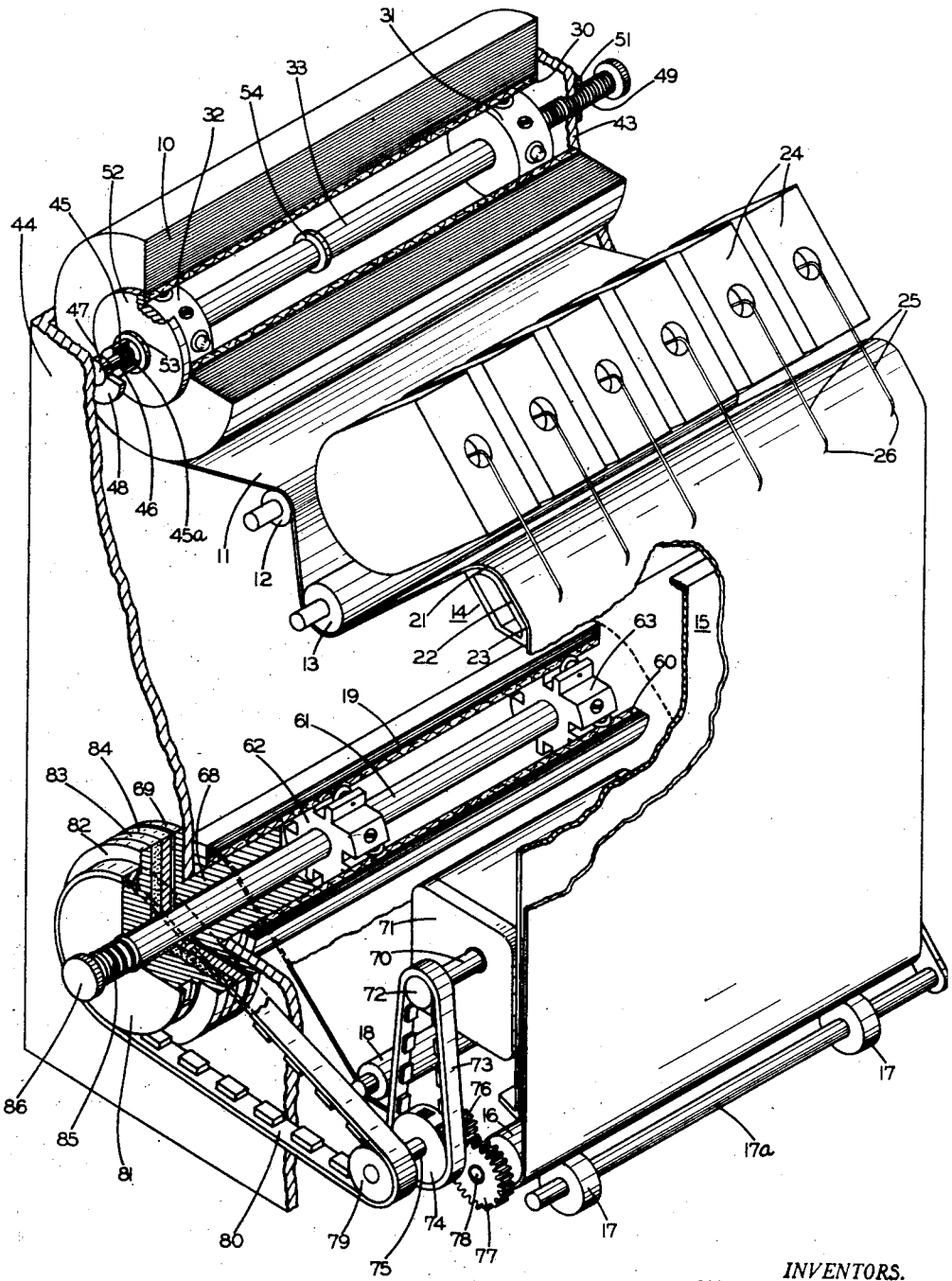
Figure 1 is a perspective view, with parts broken away for clarity, showing the multichannel pen recorder of the present invention.
Figure 2:
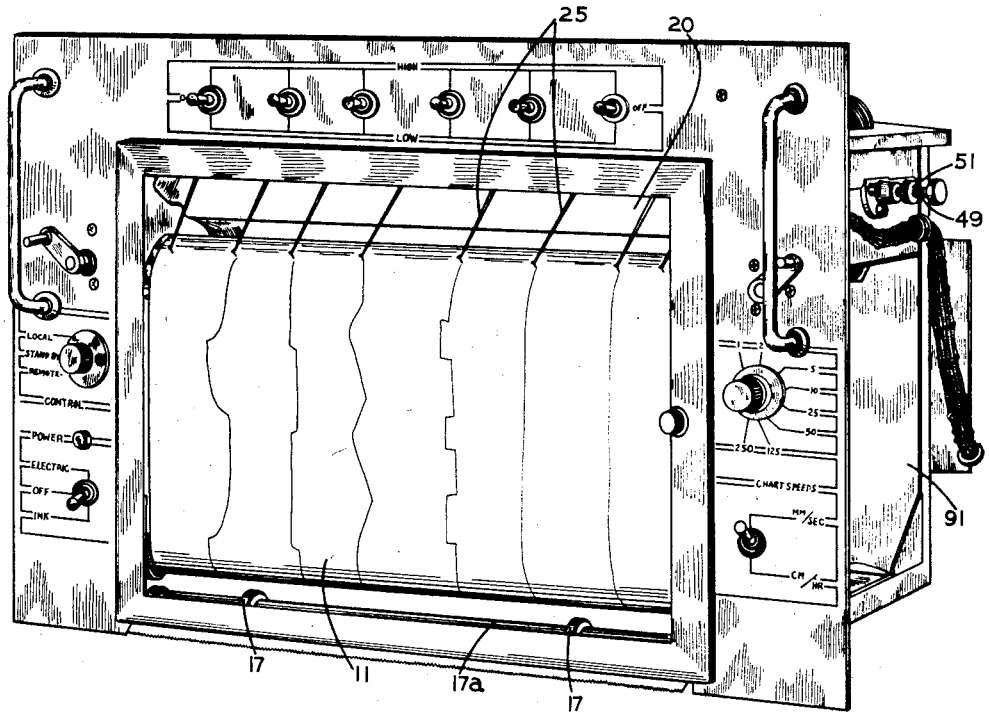
Figure 2 is a photographic perspective view of the present pen recorder, viewed from the front of the machine.
Figure 3:
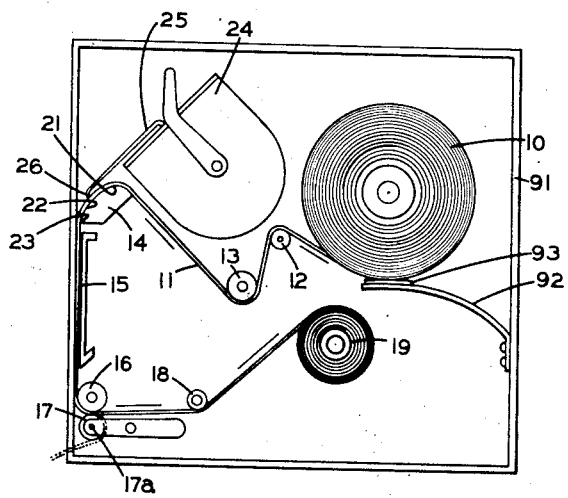
Figure 3 is a schematic transverse section through the pen recorder, showing the travel of the record chart from the supply roll and across the writing bar to the takeup roll.
Figure 4:
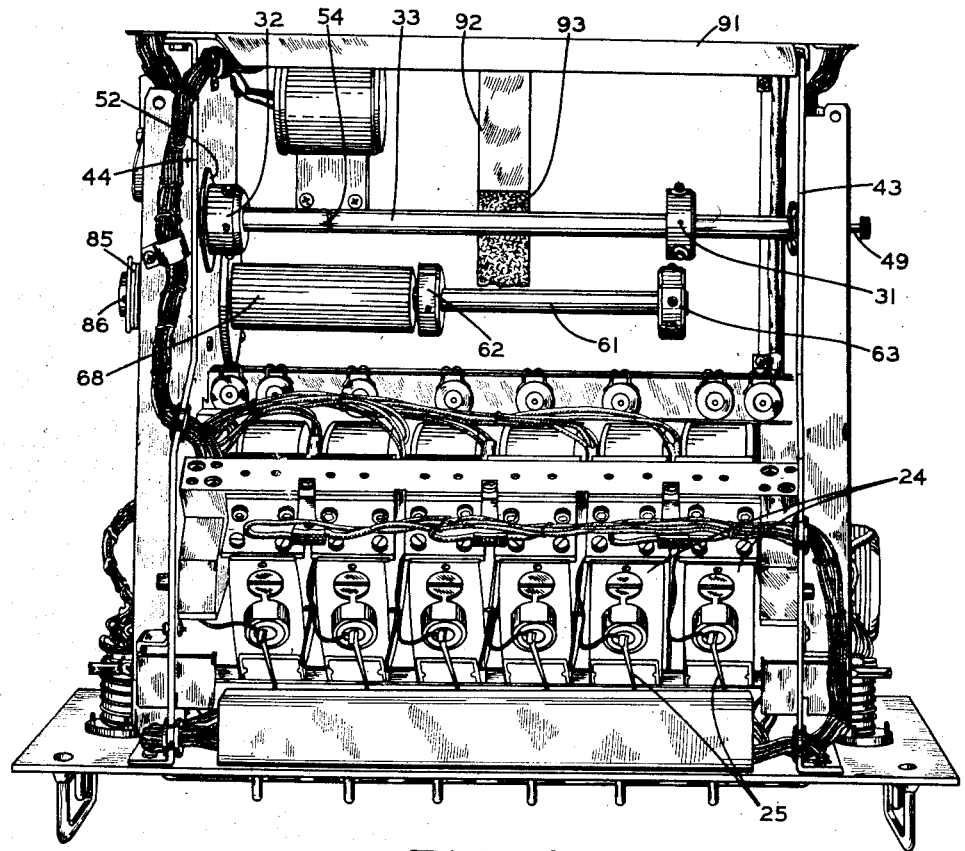
Figure 4 is a photographic reproduction which represents a top view of the pen recorder mechanism.

Referring first to Figs. 1 and 3, the general outline of the pen recorder mechanism is as follows: from the supply roll 10 the elongated flexible paper record chart 11 moves up across a stationary cylinder 12 and down around the lower side of a rotary tension roller 13. The record chart extends up from the tension roller 13 across the front of the writing bar 14 and down from the writing bar across a writing table 15, which has its vertical front face disposed directly below the lower front extremity of the writing bar. The writing bar and the writing table are mounted directly behind a front cover window 20 (Fig. 2) which is part of the housing for the instrument. Below the writing table the record chart passes between an upper motor-driven drive roller 16 and a pair of spaced, cylindrical lower pressure rollers 17 mounted rotatively on a common shaft 17a (Fig. 2) located directly below roller 16. Shaft 17a is carried by a suitable arrangement which permits the retraction of the pressure rollers 17 down away from the record chart, when desired. The record chart 11 then extends up across the bottom of a rotary tension roller 18 and up around the top of the motor-driven takeup roll 19, which winds up the record chart after the pen recordings have been made thereon.

The writing bar 14 extends transversely across the front of the pen recorder housing, presenting a convexly curved top surface 21 which extends up from the back side of the writing bar and down around to the front side of the writing bar in a gradual arc, which has a radius of ¾ inch. The curved top surface 21 merges at its lower end with the upper end of a flat front surface 22 on the writing bar which extends downward at a 45-degree angle to the vertical. The lower end of the flat surface 22 merges smoothly with the upper end of a lower convexly curved surface 23 which extends down in a gradual arc away from the flat surface 22. The radius of this arc is ¾ inch. The flat surface 22 on the writing bar extends a distance of 5/16 inch down from the lower end of the curved top surface 21 to the upper end of the lower curved surface 23. The upper and lower curved surfaces 21 and 23 at opposite ends of the flat surface 22 on the writing bar provide a very gradual change in direction for the record chart as it moves across the writing bar. The tension roller 13 exerts a downward pull on the record chart at the back side of the writing bar, while the drive roller 16 exerts a downward tension at the front side of the writing bar to pull the record chart across the vertical front face of the writing table 15. The net result of this construction is that the flexible record chart 11 is maintained flat and snug against the flat surface 22 on the writing bar, and any tendency for the record chart to billow out away from the flat 22 on the writing bar is substantially eliminated by the gradual curvature of the writing bar and the tension on the record chart at opposite sides of the writing bar as it moves thereacross.

A leaf spring 91, attached at one end to the housing back wall 92, carries on its upper face at its free end a resilient felt pad 93 which is biased to engage the underside of the supply roll to maintain slight tension on the record chart as it unwinds.

In the illustrated embodiment, the record chart is shown as having six record channels. A corresponding number of magnetic pen motors 24 are suitably mounted in the machine to have their writing styli 25 extending downward at an angle of 45 degrees. Each stylus writing tip 26 overlies the lower end of the flat portion 22 on the writing bar in the normal, unactuated position of the pen stylus, at which it overlies the middle of the corresponding channel on the record chart. The maximum swing of the recording tip of the pen stylus is correlated with the extent of the flat portion 22 on the writing bar between the upper and lower curved surfaces 21 and 23 so that the recording tip will at all times overlie a portion of the flat surface on the writing bar. Desirably each of the pen motors 24 may be of the type disclosed in detail in U. S. Letters Patent No. 2,478,329 to H. Shaper.

Figure 5:
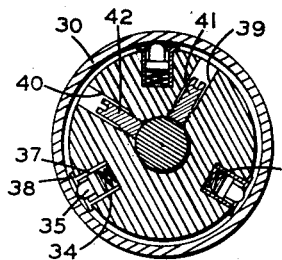
Figure 5 is a transverse section through one of the collars on which the supply roll of the record chart is mounted.
Figure 6:
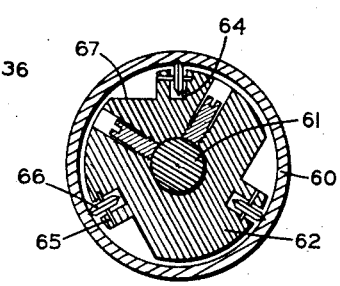
Figure 6 is a similar view through one of the collars on which the takeup roll is mounted.

At the supply roll 10 the paper record chart is wound around a supply tube 30 of cardboard or the like. This tube is supported by a pair of spaced cylindrical collars 31 and 32 carried by a rotary shaft 33. Each of the collars (Fig. 5) is formed with three evenly spaced radial recesses 34 in which are located pins 35, which are pressed radially outward by compression coil springs 36 to have their rounded outer tips protrude slightly beyond the cylindrical periphery of the collar. These spring-pressed pins frictionally engage the interior surface of the supply roll tube 30 to retain the latter on the shaft and collar assembly 31—33. A retainer in the form of a hollow sleeve 37 having a transverse inturned flange 38 is press fit into each collar recess 34 to retain the pin 35 therein. A pair of mutually perpendicular radial bores 39 and 40 in each collar receive set screws 41 and 42, which bear tightly on the shaft 33 to releasably lock the collar in place thereon.

Figure 7:
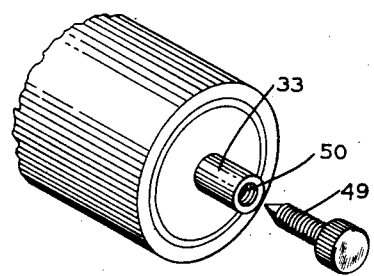
Figure 7 is a fragmentary perspective showing the arrangement for adjusting the position of the supply roll transversely within the pen recorder housing.

The supply roll shaft 33 is supported rotatably between spaced support walls 43 and 44 which are part of the housing for the machine. At the left end in Fig. 1 the shaft is formed with an internal bore 45 which receives a bolt 46 having an enlarged cylindrical head 47 at its outer end, which is rotatably supported by a bracket 48 presenting an upwardly facing semi-circular bearing surface for the bolt head. A compression coil spring 45a in bore 45 acts between the inner end of bolt 46 and shaft 33 to bias the shaft to the right in the drawings, in a direction toward the opposite support wall 43. At the opposite end of shaft 33 a screw 49 extends threadedly through the support wall 43 and has its conical inner end received snugly in a complementary recess 50 in that end of shaft 33, as best seen in Fig. 7. A jam nut 51 is provided to lock screw 49 in the position to which it has been adjusted. The supply roll assembly is mounted in place by resting the bolt head 47 at one end of shaft 33 on the support bracket 48 and then bringing the inner end of screw 49 into engagement with the recess 50 in the opposite end of shaft 33. By turning screw 49 the entire supply roll assembly can be shifted in either direction between the support walls 43, 44 in order to position the channels on the record chart properly with respect to the recording pens. It will be noted that this adjustment is very simple to carry out, being made from the outside of the instrument housing.

The supply roll assembly also has provision for converting from six channel use to four channel operation. The collar 32 on shaft 33 carries an enlarged transverse flange 52 against which the inner end of the record chart roll 10 abuts when inserted onto the assembly of shaft 33 and the collars 31 and 32 thereon. For six channel operation the collar 32 has its flange 52 abutting against a first snap ring 53 suitably located along shaft 33 adjacent its left end. For four channel operation the set screws carried by collar 32 would be loosened and this collar slid to the right along shaft 33 until its inner end abuts against a second snap ring 54 on the shaft, after which the set screws for collar 32 would again be tightened to lock it on the shaft. At this position of collar 32 its flange 52 would limit the insertion of a supply roll onto shaft 33 to only four channel width, so that four channel record chart paper would be used at this time.

At the takeup roll there is provided a novel arrangement for centering the takeup roll on the takeup shaft and for insuring that the record chart is wound up without any slip, to thereby maintain the record chart moving at uniform speed across the writing bar. The takeup roll assembly includes the usual cylindrical tube 60 of cardboard or similar material around which the record chart winds up. For supporting the tube 60 there is provided the rotary takeup shaft 61 which carries a pair of enlarged spaced collars 62 and 63. Each of these collars has a generally cylindrical periphery slightly smaller than the inner diameter of tube 60. At three evenly spaced locations around the periphery of each of these collars there are formed open slots or grooves 64 across each of which extends a cross pin 65. Rotatably mounted on each cross pin is a sharp-edged circular cutter 66 which projects beyond the periphery of the respective collar and digs into the supply roll tube 60. With this arrangement, the cutters dig into the tube 60 at evenly spaced locations around the latter's inner diameter and thereby center the supply roll on the takeup shaft 61. This is true even with variations of as much as plus or minus 1/32 inch in the inner diameter of the cardboard tubes 60, which are usual in the practical use of such equipment. It will be noted that the sharp edge on each cutter at its engagement with the tube extends in the same direction as the tube axis, so that the tube, regardless of such dimensional variations, may be readily slipped lengthwise onto the collars. However, the cutters dig into and hold the tube tightly against turning with respect to the respective collar, or vice versa. At one side of each of the slots 64 the collar is formed with another cut-away portion 67 at its periphery which facilitates the assembly of the pivot pin and cutter thereon.

At the left end of the takeup roll assembly there is provided a stationary guide sleeve 68 which has a cylindrical periphery slightly smaller than the periphery of each mounting collar 62, 63. Sleeve 68 extends loosely around the rotary takeup shaft 61 and carries an outer transverse flange 69 which abuts against the upstanding housing side wall 44.

The drive mechanism for advancing the record chart across the writing bar from the supply roll 10 to the takeup roll 19 includes a motor-driven shaft 70, which may be the output shaft of a motor-driven, variable speed transmission, indicated generally at 71. Shaft 70 carries a toothed sprocket 72 which drives a flexible toothed belt 73, commonly known as the "Gilmer timing belt." Belt 73 drives a toothed sprocket 74 carried by a rotary shaft 75. At one end, shaft 75 carries a gear 76 which drives a gear 77 mounted on the shaft 78 for the drive roller 16 at the lower end of the writing table 15. Thus, the drive from the variable speed transmission 71 is imparted to the drive roller 16 to turn the latter for moving the record chart across the writing table at the desired linear speed.

Shaft 75 also carries a toothed sprocket 79 which drives a similar toothed flexible belt 80, which in turn drives a toothed sprocket 81. At its inner side the driven sprocket 81 carries a flange 82 which presents a flat face abutting against friction material 83 carried by a clutch plate 84 secured to shaft 61. A compression coil spring 85 acts between a nut 86 threaded onto the outer end of shaft 61 and the outer end of sprocket 81 to bias the sprocket into frictional engagement with the clutch plate 84. It will be apparent that this arrangement provides a spring-pressed friction clutch for imparting rotation from the driven sprocket 81 to shaft 61, but permitting the driven sprocket to slip rotatably relative to the shaft.

The foregoing drive arrangement for the takeup shaft 61 is such that it rotates slightly faster than the drive roller 16 at all times and thereby exerts tension on the record chart. As the record chart continues to wind up on the takeup roll, the friction clutch 82—84 provides slip between the drive and shaft 61, so that the rotational speed of shaft 61 gradually decreases so as to maintain the desired tension on the record chart.

In the use and operation of the above-described mechanism, the screw 49 is retracted to permit the takeup roll shaft 33 to be removed from its rotary support in the housing. Then a roll of the record chart paper is slipped onto the assembly of shaft 33 and the collars 31, 32 thereon. The position of collar 32 along shaft 33 determines whether six channel or four channel record chart paper can be accommodated.

Then the free end of the record chart paper is passed over the idler roller 12, down around the tension roller 13, up across and down the front of the writing bar 14, back around the bottom of the drive roller 16, past the lower end of the tension roller 18 to the takeup roller assembly, where it is attached to the tube 60. Tube 60 previously will have been inserted onto the assembly of takeup shaft 61 and the collars 62, 63 thereon.

As the drive roller 16 and the takeup shaft 61 are driven from the motor drive, as described, the record chart paper is pulled at uniform linear speed from the supply roll across the front of the writing bar 14, and is finally wound around the tube 60 at the takeup roll assembly. The tension roller 13 maintains tension on the record chart at the back side of the writing bar, while the drive roller maintains tension on the record chart at the front side of the tension bar, with the result that the record chart paper passes snugly across the flat writing surface 22 on the writing bar to insure that no distortion is introduced in the recording due to the tendency for the paper to billow out away from the flat on the writing bar as it passes across the writing bar.

While there has been disclosed herein and illustrated in the accompanying drawing a specific preferred construction for accomplishing the purposes of the present invention, it is to be understood that various modifications, omissions and refinements which depart from the specific disclosed embodiment may be adopted without departing from the spirit and scope of this invention.

We claim:

1. In a visual chart recorder mechanism, the combination of a writing bar formed at its front side with a downwardly extending flat surface lying in a plane inclined at a substantial angle to the vertical, said writing bar being formed at its upper end with a convexly curved top surface merging smoothly with the upper extremity of said flat surface, said writing bar also being formed at its front side with a lower convexly curved surface merging smoothly with the lower extremity of said flat surface and extending downward away from said flat surface, a flexible record chart extending from the back side of the writing bar up across said curved top surface and down across said flat surface and down across said lower curved surface, means exerting downward tension on the record chart on opposite sides of the writing bar to maintain the record chart in snug engagement with said curved top surface, said flat surface and said lower curved surface on the writing bar, and an arcuately movable visual recorder having a recording element overlying said flat surface on the writing bar with the height of the arc described by the arcuately movable visual recorder extending in a direction parallel to the direction of motion of said record chart, the length of the flat portion of said writing bar in the direction of motion of said record chart being only slightly greater than the height of the arc described by said arcuately movable recorder.

2. In a pen recorder mechanism, the combination of a writing bar formed at its front side with a downwardly extending flat surface lying in a plane inclined at a substantial angle to the vertical, said writing bar being formed at its upper end with a convexly curved top surface merging smoothly with the upper extremity of said flat surface and away from said top surface extending downward at the back side of the writing bar, said writing bar also being formed at its front side with a lower convexly curved surface merging smoothly with the lower extremity of said flat surface and extending downward away from said flat surface, a supply roll at the back side of the writing bar, a takeup roller at the back side of the writing bar, a flexible record chart extending from said supply roll and across said writing bar to said takeup roller, a tension roller positioned lower than the writing bar at the back side thereof and engaging the record chart between the supply roll and said top surface on the writing bar to maintain downward tension on the record chart, a writing table having a vertical flat surface directly below the lower curved surface on the writing bar, a drive roller below said writing table engaging the record chart between the writing bar and the takeup roller to exert downward tension on the record chart at the front side of the writing bar maintaining the record chart in snug engagement with the top curved surface, the inclined flat surface and the lower curved surface on the writing bar as the record chart moves across the writing bar, and a pen motor carrying an arcuately movable pen stylus having its recording tip overlying said flat surface on the writing bar to record a trace on the record chart thereat with the height of the arc described by the tip of said arcuately movable pen stylus parallel to the direction of motion of said record chart, the length of the flat portion of said writing bar in the direction of motion of said record chart being only slightly greater than the height of the arc described by said recording element.

3. The mechanism of claim 2, wherein the pen stylus extends downward at an angle from the back side of the writing bar and is mounted for movement of its recording tip across the portion of the record chart which overlies the flat surface on the writing bar arcuately transverse to the direction of movement of the record chart across the writing bar.

4. The mechanism of claim 3, wherein the normal unactuated position of the recording tip on the pen stylus and the maximum arcuate swing of said recording tip on either side of said unactuated position are correlated with the extent of said flat surface on the writing bar in the direction of movement of the record chart thereacross such that upon maximum swing of the pen stylus its recording tip is maintained overlying the flat surface on the writing bar at all times.

5. In a pen recorder mechanism, the combination of a writing bar formed at its front side with a downwardly extending flat surface lying in a plane inclined at a substantial angle to the vertical, said writing bar being formed at its upper end with a convexly curved top surface merging smoothly with the upper extremity of said flat surface, said writing bar also being formed at its front side with a lower convexly curved surface merging smoothly with the lower extremity of said flat surface and extending downward away from said flat surface, a supply roll at the back side of the writing bar, a takeup roller at the back side of the writing bar, a flexible record chart extending from said supply roll and across said writing bar to said takeup roller, means engaging the record chart between the supply roll and said top surface on the writing bar to maintain downward tension on the record chart at the back side of the writing bar, means engaging the record chart between the writing bar and the takeup roller to exert downward tension on the record chart at the front side of the writing bar maintaining the record chart in snug engagement with the top curved surface, the inclined flat surface and the lower curved surface on the writing bar as the record chart moves across the writing bar, and a pen motor carrying an arcuately movable pen stylus having its recording tip overlying said flat surface on the writing bar to record a trace on the record chart thereat with the height of the arc described by the tip of said arcuately movable pen stylus parallel to the direction of motion of said record chart, the length of the flat portion of said writing bar in the direction of motion of said record chart being only slightly greater than the height of the arc described by said recording element.

6. The mechanism of claim 5, wherein the pen stylus extends downward at an angle from the back side of the writing bar and is mounted for movement of its recording tip across the portion of the record chart which overlies the flat surface on the writing bar.

7. In a pen recorder assembly, the combination of a supply roller, a multichannel record chart roll mounted on said supply roller and extending away therefrom, pen recorder means for recording on the record chart beyond the supply roller, and takeup means beyond said pen recorder means for taking up the record chart, said takeup means including a hollow tube around which the record chart wraps, a rotary shaft extending through said tube, a plurality of enlarged collars on said shaft disposed within said tube and each formed with a plurality of peripheral openings, cross pins carried by said collars and extending across the respective peripheral openings therein substantially perpendicular to the axis of said shaft, and rotary circular cutters mounted on said cross pins and presenting sharp edges which project beyond the periphery of the respective collar and which dig into and hold the tube snugly to center the tube on said shaft and to cause the tube to turn in unison with the shaft.

8. In a multichannel pen recorder assembly, the combination of a housing presenting a pair of spaced support walls, a writing bar extending between said support walls and at its front side presenting a downwardly extending flat surface lying in a plane inclined at a substantial angle to the vertical, said writing bar at its upper end presenting a convexly curved top surface merging smoothly with the upper extremity of said flat surface and extending downward at the back side of the writing bar, said writing bar also at its front side presenting a lower convexly curved surface merging smoothly with the lower extremity of said flat surface and extending downward away from said flat surface, a rotatively mounted supply roll shaft extending between said upstanding housing walls at the back side of the writing bar, a takeup roller at the back side of the writing bar, a flexible multichannel record chart extending from said supply roll shaft across said writing bar to said takeup roller, a tension roller positioned lower than the writing bar at the back side thereof and engaging the record chart between the supply roll shaft and said top surface on the writing bar to maintain downward tension on the record chart at the back side of the writing bar, a writing table presenting a vertical flat surface directly below the lower curved surface on the writing bar, a drive roller below said writing table engaging the record chart between the writing bar and the takeup roller and exerting downward tension on the record chart at the front side of the writing bar maintaining the record chart in snug engagement with the top curved surface, the inclined flat surface and the lower curved surface on the writing bar as the record chart moves across the writing bar, a plurality of pen motors carrying respective recording styli having their respective recording tips overlying said flat surface on the writing bar to record traces on the record chart thereat, each said pen stylus extending downward at an angle from the back side of the writing bar and mounted for movement of its recording tip across the portion of the record chart which overlies the flat surface on the writing bar arcuately transverse to the direction of movement of the record chart across the writing bar.

9. In a multichannel pen recorder assembly, the combination of a housing presenting a pair of spaced support walls, a writing bar extending between said support walls and formed at its front side with a downwardly extending flat surface lying in a plane inclined at a substantial angle to the vertical, said writing bar being formed at its upper end with a convexly curved top surface merging smoothly with the upper extremity of said flat surface and extending downward at the back side of the writing bar, said writing bar also being formed at its front side with a lower convexly curved surface merging smoothly with the lower extremity of said flat surface and extending downward away from said flat surface, a rotatively mounted supply roller extending between said upstanding housing walls at the back side of the writing bar, a takeup roller at the back side of the writing bar, a flexible multichannel record chart extending from said supply roller across said writing bar to said takeup roller, a tension roller positioned lower than the writing bar at the back side thereof and engaging the record chart between the supply roller and said top surface on the writing bar to maintain downward tension on the record chart at the back side of the writing bar, a writing table presenting a vertical flat surface directly below the lower curved surface on the writing bar, a drive roller below said writing table engaging the record chart between the writing bar and the takeup roller and exerting downward tension on the record chart at the front side of the writing bar maintaining the record chart in snug engagement with the top curved surface, the inclined flat surface and the lower curved surface on the writing bar as the record chart moves across the writing bar, and a plurality of pen motors carrying respective recording styli having their respective recording tips overlying said flat surface on the writing bar to record traces on the record chart thereat, each said pen stylus extending downward at an angle from the back side of the writing bar and mounted for movement of its recording tip across the portion of the record chart which overlies the flat surface on the writing bar arcuately transverse to the direction of movement of the record chart across the writing bar, said supply roller comprising a rotary shaft and a pair of enlarged collars on said shaft for supporting the record chart thereon, one of said collars having an enlarged transverse flange limiting the insertion of the record chart on the supply roller, said one collar being mounted for adjustment along the shaft to accommodate record charts of different widths.

10. In a multichannel pen recorder assembly, the combination of a housing presenting a pair of spaced support walls, a writing bar extending between said support walls and formed at its front side with a downwardly extending flat surface lying in a plane inclined at a substantial angle to the vertical, said writing bar being formed at its upper end with a convexly curved top surface merging smoothly with the upper extremity of said flat surface and away from said flat surface extending downward at the back of the writing bar, said writing bar also being formed at its front side with a lower convexly curved surface merging smoothly with the lower extremity of said flat surface and extending downward away from said flat surface, a rotatively mounted supply roller extending between said upstanding housing walls at the back side of the writing bar, takeup means at the back side of the writing bar, a flexible multichannel record chart extending from said supply roller and across said writing bar to said takeup means, said takeup means including a hollow tube around which the record chart wraps, a rotary shaft extending axially through said tube, a plurality of enlarged collars on said shaft disposed within said tube and each formed with a plurality of peripheral openings, cross pins carried by said collars and extending across said openings substantially perpendicular to the axis of said shaft, and rotary circular cutters mounted on said cross pins and presenting sharp edged peripheries which project beyond the periphery of the respective collar and which engage and hold the tube, a tension roller positioned lower than the writing bar at the back side thereof and engaging the record chart between the supply roller and said top surface on the writing bar to maintain downward tension on the record chart at the back side of the writing bar, a writing table presenting a vertical flat surface directly below the lower curved surface on the writing bar, a drive roller below said writing table engaging the record chart between the writing bar and said takeup means and exerting downward tension on the record chart maintaining the record chart in snug engagement with the top curved surface, the inclined flat surface and the lower curved surface on the writing bar as the record chart moves across the writing bar, and a plurality of pen motors carrying respective recording styli having their respective recording tips overlying said flat surface on the writing bar to record traces on the record chart thereat, each said pen stylus extending downward at an angle from the back side of the writing bar and mounted for movement of its recording tip across the portion of the record chart which overlies the flat surface on the writing bar arcuately transverse to the direction of movement of the record chart across the writing bar, said supply roller comprising a rotary shaft and a pair of enlarged collars on said shaft for supporting the record chart thereon, one of said collars having an enlarged transverse flange limiting the insertion of the record chart roll on the supply roller, said one collar being mounted for adjustment along the shaft to accommodate record charts of different widths.

11. In a multichannel pen recorder assembly, the combination of a housing having a pair of spaced support walls, a rotatively mounted supply roller extending between said support walls, a multichannel record chart roll mounted on said supply roller and extending away therefrom, a plurality of pen recorders located beyond said supply roller and having provision for recording on individual channels of the record chart, said supply roller comprising a rotary shaft and a pair of enlarged collars on said shaft for supporting the record chart roll thereon, one of said collars having an enlarged transverse flange limiting the insertion of the record chart roll on the supply roller, said collar being mounted for adjustment along the shaft to accommodate record charts of different widths, and takeup means beyond the pen recorders for taking up the record chart, said takeup means including a hollow tube around which the record chart wraps, a rotary shaft extending axially through said tube, a plurality of enlarged collars on said last-mentioned shaft disposed within said tube and each formed with a plurality of peripheral openings, cross pins carried by said last-mentioned collars and extending across the respective peripheral openings therein substantially perpendicular to the axis of said shaft, and rotary circular cutters mounted on said cross pins and presenting sharp edges which project beyond the periphery of the respective collar and which engage and hold the tube snugly to cause the tube to turn in unison with said last-mentioned shaft.

12. In combination, a flexible elongated record chart, a hollow tube around which the record chart is wrapped, a rotary shaft extending axially through said tube, an enlarged collar on said shaft disposed within said tube and formed with a plurality of peripheral openings, cross pins carried by said collar and extending across the respective peripheral openings therein substantially perpendicular to the axis of the said shaft, and rotary circular cutters mounted on said cross pins and presenting sharp edges which project beyond the periphery of the collar and which dig into and hold the tube snugly to center the tube on said shaft and to cause the tube to turn in unison with the shaft.

References Cited in the file of this patent

UNITED STATES PATENTS

| 1,235,334 | Landis | July 31, 1917 |
| 1,411,698 | Hepler | Apr. 4, 1922 |
| 1,816,826 | Cooper et al. | Aug. 4, 1931 |
| 1,880,008 | Angus | Sept. 27, 1932 |
| 1,907,096 | Angus | May 2, 1933 |
| 2,321,273 | Belcher | June 8, 1943 |
| 2,616,633 | Reynolds | Nov. 4, 1952 |
| 2,618,528 | Caldwell | Nov. 18, 1952 |
| 2,659,542 | Steuber | Nov. 17, 1953 |
| 2,724,631 | Ruhland | Nov. 22, 1955 |